United States Patent
Seo et al.

(10) Patent No.: US 9,458,313 B2
(45) Date of Patent: Oct. 4, 2016

(54) HEAT-RESISTANT SAN RESIN, METHOD FOR MANUFACTURING SAME, AND HEAT-RESISTANT ABS RESIN COMPOSITION COMPRISING SAME

(71) Applicant: LG CHEM, LTD., Seoul (KR)

(72) Inventors: Jae Bum Seo, Daejeon (KR); Chang Hun Han, Daejeon (KR); Dae Woo Lee, Daejeon (KR); Jung Tae Park, Daejeon (KR); Eun Jung Choi, Daejeon (KR); Byoung Il Kang, Daejeon (KR); Da Eun Sung, Daejeon (KR); Gyu Sun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/764,555

(22) PCT Filed: Feb. 27, 2014

(86) PCT No.: PCT/KR2014/001621
§ 371 (c)(1),
(2) Date: Jul. 29, 2015

(87) PCT Pub. No.: WO2015/002373
PCT Pub. Date: Jan. 8, 2015

(65) Prior Publication Data
US 2016/0108224 A1    Apr. 21, 2016

(30) Foreign Application Priority Data

Jul. 2, 2013 (KR) .................. 10-2013-0076845
Feb. 14, 2014 (KR) .................. 10-2014-0017211

(51) Int. Cl.
| | |
|---|---|
| C08F 290/04 | (2006.01) |
| C08K 5/00 | (2006.01) |
| C08G 63/48 | (2006.01) |
| C08L 25/02 | (2006.01) |
| C08F 20/44 | (2006.01) |
| C08F 112/02 | (2006.01) |
| C08L 25/12 | (2006.01) |
| C08F 2/02 | (2006.01) |
| C08F 212/10 | (2006.01) |
| C08L 25/16 | (2006.01) |
| C08L 55/02 | (2006.01) |

(52) U.S. Cl.
CPC .................. *C08L 25/12* (2013.01); *C08F 2/02* (2013.01); *C08F 212/10* (2013.01); *C08L 25/16* (2013.01); *C08L 55/02* (2013.01)

(58) Field of Classification Search
CPC ........ C08L 25/06; C08L 25/10; C08L 25/12; C08L 2205/02
USPC ........... 524/504, 515; 525/241, 71; 526/341, 526/346
See application file for complete search history.

(56) References Cited

U.S. PATENT DOCUMENTS

| | | | |
|---|---|---|---|
| 4,755,576 A | 7/1988 | Zabrocki et al. | |
| 4,795,780 A | 1/1989 | Wingler et al. | |
| 4,874,829 A * | 10/1989 | Schwier ............... | C08F 212/12 526/262 |
| 5,254,650 A * | 10/1993 | Fukumura ............ | C08F 212/12 430/109.3 |
| 7,135,510 B2 | 11/2006 | Warth et al. | |
| 2003/0032747 A1 | 2/2003 | Lee et al. | |

FOREIGN PATENT DOCUMENTS

| | | |
|---|---|---|
| KR | 10-1998-0050090 A | 9/1998 |
| KR | 10-0401312 B1 | 10/2003 |
| KR | 10-0755441 B1 | 9/2007 |
| KR | 10-2009-0075486 A | 7/2009 |
| KR | 10-2012-0016341 A | 2/2012 |

OTHER PUBLICATIONS

International search report for PCT/KR2014/001621 filed on Feb. 27, 2014.
Extended European Search Report for European Application No. 14819373.3 dated Jun. 30, 2016.

* cited by examiner

Primary Examiner — William Cheung

(57) ABSTRACT

Disclosed are a heat-resistant SAN resin, a method of preparing the same, and a heat-resistant ABS resin composition comprising the same. More particularly, a heat-resistant SAN resin comprising 60 to 75 wt % of α-methylstyrene, 25 to 35 wt % of a vinyl cyan compound, and 0 to 10 wt % of an aromatic vinyl compound (except for α-methylstyrene), the heat-resistant SAN resin having a degree of branching of 0.40 to 0.60, a molecular weight of 90,000 to 150,000 g/mol, and a glass transition temperature (Tg) of 124 to 140° C., a method of preparing the same, and a heat-resistant ABS resin composition comprising the same are disclosed.

12 Claims, No Drawings

HEAT-RESISTANT SAN RESIN, METHOD FOR MANUFACTURING SAME, AND HEAT-RESISTANT ABS RESIN COMPOSITION COMPRISING SAME

CROSS-REFERENCE TO RELATED APPLICATIONS

The present application is a National Stage of International Patent Application No. PCT/KR2014/001621 filed Feb. 27, 2014, which claims priority of Korean Patent Application Nos. 10-2013-0076845 and 10-2014-0017211 filed on Jul. 2, 2013 and Feb. 14, 2014 respectively, which are incorporated herein by reference in their entireties.

TECHNICAL FIELD

The present invention relates to a heat-resistant SAN resin, a method of preparing the same, and a heat-resistant ABS resin composition comprising the same. More particularly, the present invention relates to a heat-resistant SAN resin having excellent heat resistance and productivity, and excellent improvement effects for heat resistance, environmental crack resistance, color, and processability when applied to an ABS resin, a method of preparing the same, and a heat-resistant ABS resin composition comprising the same.

BACKGROUND ART

Styrene-acrylonitrile (SAN) resins as copolymer resins prepared by polymerizing styrene (SM) and acrylonitrile (AN) have excellent transparency, chemical resistance, stiffness, and the like, and, thus, are broadly used in electrical, electronic, household, office, and vehicle components, and the like.

In addition, although SAN resins have excellent processability, impact resistance, and the like, they are applied to ABS resins having low heat resistance to reinforce heat resistance.

However, since the heat deflection temperature of SAN resins is approximately 100 to 105° C., application of SAN resins to products requiring high heat resistance is limited.

To provide high heat resistance, an α-methylstyrene (AMS) monomer is generally introduced into SAN resins. Since AMS has low depolymerization temperature and generates many oligomers with increasing polymerization temperature, heat resistance is decreased. Accordingly, unlike general SAN polymerization, AMS must be polymerized at low temperature and, as such, a polymerization rate is slowed.

To resolve such problems, although a method of extending reaction maintenance time, a method of adding a large amount of initiator, or the like is used, productivity is decreased, color of final products becomes poor, or poor molded products are produced due to molecular weight reduction.

PRIOR PATENT LITERATURE

U.S. Pat. Nos. 5,254,650, 4,795,780, 4,874,829, and 4,755,576

DISCLOSURE

Technical Problem

Therefore, the present invention has been made in view of the above problems, and it is one object of the present invention to provide a heat-resistant SAN resin having excellent heat resistance and productivity, and excellent improvement effects for heat resistance, environmental crack resistance, color, and processability when applied to an ABS resin, a method of preparing the same, and a heat-resistant ABS resin composition comprising the same.

All of the above objective and other objectives of the present invention may be achieved by the invention described below.

Technical Solution

In accordance with one aspect of the present invention, provided is a heat-resistant SAN resin comprising 60 to 75 wt % of α-methylstyrene, 25 to 35 wt % of a vinyl cyan compound, and 0 to 10 wt % of an aromatic vinyl compound (except for α-methylstyrene), the heat-resistant SAN resin having a degree of branching of 0.40 to 0.60, a molecular weight of 90,000 to 150,000 g/mol, and a glass transition temperature (Tg) of 124 to 140° C.

In accordance with another aspect of the present invention, provided is a method of preparing a heat-resistant SAN resin, the method comprising polymerizing by adding 0.05 to 0.5 parts by weight of a multifunctional initiator to 100 parts by weight of a monomer mixture comprising 60 to 75 wt % of α-methylstyrene, 25 to 35 wt % of a vinyl cyan compound, and 0 to 10 wt % of an aromatic vinyl compound (except for α-methylstyrene).

In accordance with yet another aspect of the present invention, provided is a heat-resistant ABS resin composition comprising an ABS resin and SAN resin, and the SAN resin having a degree of branching of 0.40 to 0.60, a molecular weight of 90,000 to 150,000 g/mol, and a glass transition temperature (Tg) of 124 to 140° C., the SAN resin comprising 60 to 75 wt % of α-methylstyrene, 25 to 35 wt % of a vinyl cyan compound, and 0 to 10 wt % of an aromatic vinyl compound (except for α-methylstyrene).

Advantageous Effects

As apparent from the fore-going, the present invention advantageously provides a heat-resistant SAN resin having excellent heat resistance and productivity, and excellent improvement effects for heat resistance, environmental crack resistance, color, and processability when applied to an ABS resin, a method of preparing the same, and a heat-resistant ABS resin composition comprising the same.

BEST MODE

Hereinafter, the present invention will be described in more detail.

A heat-resistant SAN resin of the present invention comprises 60 to 75 wt % of α-methylstyrene, 25 to 35 wt % of a vinyl cyan compound, and 0 to 10 wt % of an aromatic vinyl compound (except for α-methylstyrene), and has a degree of branching of 0.40 to 0.60, a molecular weight of 90,000 to 150,000 g/mol, and a glass transition temperature (Tg) of 124 to 140° C.

In one embodiment, the vinyl cyan compound is acrylonitrile, methacrylonitrile, ethacrylonitrile, or the like.

In one embodiment, the amount of the aromatic vinyl compound is styrene, p-bromostyrene, p-methylstyrene, p-chlorostyrene, o-bromostyrene, or the like.

In one embodiment, the amount of the α-methylstyrene is 65 to 75 wt % or 68 to 71 wt %. Within this range, excellent heat resistance is exhibited and a transition ratio is not reduced.

In one embodiment, the amount of the vinyl cyan compound is 25 to 32 wt % or 28 to 31 wt %. Within this range, an excellent polymerization transition ratio, strength, heat resistance, and environmental stress crack resistance (ESCR) are exhibited.

In one embodiment, the amount of the aromatic vinyl compound is 0.1 to 10 wt % or 0.1 to 5 wt %. Within this range, a proper polymerization rate is maintained and excellent heat resistance is exhibited.

In one embodiment, a degree of branching of the SAN resin is 0.40 to 0.55 or 0.41 to 0.51. Within this range, high heat resistance and excellent chemical resistance are exhibited.

In one embodiment, a molecular weight of the SAN resin is 90,000 to 120,000 g/mol, 91,000 to 110,000 g/mol, or 94,000 to 102,000 g/mol. Within this range, excellent chemical resistance and strength are exhibited.

In one embodiment, glass transition temperature (Tg) of the SAN resin is 124 to 135° C., 124 to 130° C., or 124 to 128° C. Within this range, a heat-resistant ABS has excellent heat resistance and strength balance.

In one embodiment, an oligomer content in the heat-resistant SAN resin is 0.1 to 0.8 wt %, 0.3 to 0.8 wt %, or 0.4 to 0.7 wt %. Within this range, high heat resistance is exhibited.

A method of preparing a heat-resistant SAN resin of the present invention comprises polymerizing by adding 0.05 to 0.5 parts by weight of a multifunctional initiator to 100 parts by weight of a monomer mixture comprising 60 to 75 wt % of α-methylstyrene, 25 to 35 wt % of a vinyl cyan compound, and 0 to 10 wt % of an aromatic vinyl compound (except for α-methylstyrene).

In one embodiment, the multifunctional initiator comprises 2 to 4 functional groups. Within this range, productivity and heat resistance of the SAN resin are excellent.

In one embodiment, the functional groups are peroxide groups. In this case, productivity and heat resistance of the SAN resin are excellent.

In another embodiment, the multifunctional initiator may be at least one selected from the group consisting of 1,1-bis(t-butylperoxy) cyclohexane(1,2-bis(t-butylperoxy)cyclohexane), 2,2-bis(4,4-di-t-butylperoxy cyclohexyl)propane(2,2-bis(4,4-di-t-butylperoxy cyclohexyl)propane), and a compound represented by Formula 1 below. In this case, productivity and heat resistance of the SAN resin are excellent:

[Formula 1]

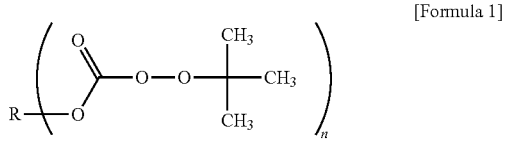

wherein n is 2, 3, or 4 and R is tetravalent alkane ($C_nH_{2n-2}$) or tetravalent polyether.

In one embodiment, the amount of the multifunctional initiator is 0.05 to 0.3 parts by weight, or 0.1 to 0.2 parts by weight. Within this range, a prepared SAN has excellent processability and color.

In one embodiment, before polymerization, a hydrocarbon solvent may be added in an amount of 0 to 50 parts by weight, 0 to 30 parts by weight, 0 to 10 parts by weight, or 0.1 to 10 parts by weight to 100 parts by weight of the monomer mixture. Within this range, excessive viscosity increase or transition ratio reduction during polymerization is inhibited.

So long as the hydrocarbon solvent may be used to bulk polymerize the SAN resin, the hydrocarbon solvent is not specifically limited.

In one embodiment, polymerization is performed at 95 to 105° C. or 100 to 105° C. Within this range, a polymerization transition ratio and heat resistance are excellent.

In one embodiment, a polymerization transition ratio in the polymerization is 50 to 65% or 54 to 64%. Within this range, rapid viscosity increase in a reactor is inhibited and, thus, productivity is excellent.

In one embodiment, the method of preparing the heat-resistant SAN resin of the present invention may comprise removing by volatilizing an unreacted monomer and solvent at a reduced pressure of 25 Torr or less, or 10 to 25 Torr after polymerization. In this case, oligomer content in a product is low and heat resistance is high.

In one embodiment, the step of removing by volatilizing the unreacted monomer and solvent may be carried out at 200 to 250° C., or 210 to 230° C. Within this range, excellent color is exhibited.

The heat-resistant ABS resin composition of the present invention comprises an ABS resin and SAN resin and the SAN resin having a degree of branching of 0.40 to 0.60, a molecular weight of 90,000 to 150,000 g/mol, and a glass transition temperature (Tg) of 124 to 140° C., the SAN resin comprising 60 to 75 wt % of α-methylstyrene, 25 to 35 wt % of a vinyl cyan compound, and 0 to 10 wt % of an aromatic vinyl compound (except for α-methylstyrene).

In one embodiment, MI of the heat-resistant ABS resin composition is 5 to 7, or 5.1 to 6.8. Within this range, processability, heat resistance, and color characteristics are excellent.

So long as the ABS resin comprises a vinyl cyan compound, a conjugated diene compound, and an aromatic vinyl compound, the ABS resin is not specifically limited.

In one embodiment, the ABS resin may be a graft copolymer in which a vinyl cyan compound and aromatic vinyl compound are graft polymerized with a conjugated diene rubber.

In one embodiment, the heat-resistant ABS resin composition may further comprise an antioxidant.

In one embodiment, the antioxidant may be a hindered phenolic antioxidant, a phosphorous antioxidant, or a mixture thereof. In this case, weather resistance and heat resistance are excellent.

Now, the present invention will be described in more detail with reference to the following examples. These examples are provided only for illustration of the present invention and should not be construed as limiting the scope and spirit of the present invention.

EXAMPLE

Examples 1 to 9 and Comparative Examples 1 to 6

<Preparation of Heat-Resistant SAN Resin>

As summarized in Tables 1 to 3 below, 1 to 10 parts by weight of toluene, as needed, were mixed with a monomer mixture composed of 60 to 80 parts by weight of α-methylstyrene (AMS) and 20 to 40 parts by weight of acrylonitrile (AN), and 0 to 3 parts by weight of styrene (SM) to prepare a mixture.

As summarized in Tables 1 to 3, 0.1 to 0.2 parts by weight of 2,2-Bis(4,4-di-t-butylperoxy cyclohexyl) propane (Initiator 1) and/or 1,1-Bis(t-butylperoxy) cyclohexane (Initiator 2) as an initiator were added to the mixture so as to prepare a polymerization solution. Subsequently, the polymerization solution was continuously added to a 95 to 105° C. reactor for polymerization. Subsequently, unreacted monomers and a solvent were removed in a 200 to 250° C. volatilization bath under a vacuum of 15 to 30 Torr and then a pellet-type SAN resin was prepared using a die and a pelletizer.

<ABS Resin (Powder)>

LG ABS DP (styrene:acrylonitrile=75:25, butadiene content=60%) was used.

<Preparation of Heat-Resistant ABS Resin Composition>

27 parts by weight of the ABS resin (powder) was mixed with 73 parts by weight of the prepared heat-resistant SAN resin and 0.2 parts by weight of an antioxidant Irgafos 168, Irganox 1076, Irganox 1010 or Irganox 245) was added thereto. Subsequently, a resultant mixture was added to a 240° C. extruder (280), resulting in preparation of a pellet-type heat-resistant ABS resin composition. The resultant pellet was injection molded to prepare a specimen.

Test Example

Characteristics of the property specimens prepared according to Examples 1 to 9 and Comparative Examples 1 to were measured according to methods below. Results are summarized in Tables 1 to 3 below.

Glass transition temperature (Tg): was measured using Pyris 6 DSC available from Perkin Elmer.

AMS-SAN composition: a resin composition was measured using C NMR.

Molecular weight (Mw): was measured as a relative value to a polystyrene standard (PS) sample using GPC (Waters Breeze).

Degree of branching: was found by a grade obtained by plotting Log $r_g$ to Log Mw after measuring a molecular weight and radius of gyration ($r_g$) using multi-angle laser light scattering (MALLS).

A degree of branching of 1 means that a polymer is not branched (linear form). On the other hand, when a value of the degree of branching is 0.3, many parts in a polymer are branched and, thus, are crosslinked (circular form). Therefore, it can be confirmed that, when a degree of branching is close to 0.3, many parts in a polymer are branded.

Melting index (MI): was measured at 220° C. under a load of 10 kg for 10 minutes according to ASTM D1238.

Impact strength (¼", kgm/cm): was measured according to ASTM D256 (Izod impact).

Heat deflection temperature (HDT, ° C.): was measured according to ASTM D648.

Color (Color b): a yellow index of a sample was measured using a Hunter Lab colorimeter.

Amount of oligomer remainder: was analyzed by gel chromatography.

Environmental Stress Cracking Resistance (ESCR): crack generation time was measured after placing a thinner in the middle of a specimen using a 1% strain zig.

TABLE 1

| Classification | | Example 1 | Example 2 | Example 3 | Example 4 | Example 5 |
|---|---|---|---|---|---|---|
| Polymerization temperature | | 105 | 100 | 100 | 100 | 100 |
| Transition ratio | | 59 | 56 | 57 | 57 | 54 |
| Backend process vacuum degree (torr) | | 20 | 20 | 20 | 20 | 20 |
| Composition of polymerization solution (wt %) | AMS | 68 | 68 | 70 | 70 | 70 |
| | AN | 29 | 29 | 30 | 30 | 30 |
| | SM | 3 | 3 | 0 | 0 | 0 |
| | Initiator 1 | 0.17 | 0.17 | 0.17 | 0.2 | 0.1 |
| | Initiator 2 | 0 | 0 | 0 | 0 | 0 |
| Composition of heat-resistant SAN (wt %) | AMS | 68 | 68 | 71 | 71 | 71 |
| | AN | 28 | 28 | 29 | 29 | 29 |
| | SM | 4 | 4 | 0 | 0 | 0 |
| Properties of heat-resistant SAN | Tg(° C.) | 126 | 127 | 128 | 127 | 127 |
| | Mw | 96,000 | 99,000 | 98,000 | 97,000 | 102,000 |
| | Degree of branching | 0.43 | 0.42 | 0.43 | 0.41 | 0.51 |
| | Amount of oligomer | 0.6 | 0.4 | 0.4 | 0.4 | 0.4 |
| Properties of heat-resistant ABS resin composition | Impact strength | 24 | 23 | 23 | 23 | 26 |
| | Heat deflection temperature | 111 | 112 | 113 | 112 | 113 |
| | Color(b) | 13 | 14 | 14 | 13 | 14 |
| | ESCR | 175 | 204 | 199 | 186 | 227 |
| | MI | 6.1 | 5.8 | 5.9 | 5.9 | 5.1 |

TABLE 2

| Classification | Example 6 | Example 7 | Example 8 | Example 9 | Comparative Example 1 |
|---|---|---|---|---|---|
| Polymerization temperature | 100 | 105 | 105 | 105 | 105 |
| Transition ratio | 64 | 59 | 59 | 59 | 60 |
| Backend process vacuum | 20 | 25 | 15 | 20 | 20 |

TABLE 2-continued

| Classification | | Example 6 | Example 7 | Example 8 | Example 9 | Comparative Example 1 |
|---|---|---|---|---|---|---|
| degree (torr) | | | | | | |
| Composition of polymerization solution (wt %) | AMS | 65 | 68 | 68 | 68 | 68 |
| | AN | 35 | 29 | 29 | 29 | 29 |
| | SM | 0 | 3 | 3 | 3 | 3 |
| | Initiator 1 | 0.17 | 0.17 | 0.17 | 0.1 | 0 |
| | Initiator 2 | 0 | 0 | 0 | 0.1 | 0.17 |
| Composition of heat-resistant SAN (wt %) | AMS | 69 | 68 | 68 | 68 | 68 |
| | AN | 31 | 28 | 28 | 28 | 28 |
| | SM | 0 | 4 | 4 | 4 | 4 |
| Properties of heat-resistant SAN | Tg(° C.) | 126 | 124 | 128 | 125 | 122 |
| | Mw | 101,000 | 97000 | 94000 | 94000 | 83000 |
| | Degree of branching | 0.44 | 0.44 | 0.44 | 0.49 | 0.65 |
| | Amount of oligomer | 0.4 | 0.7 | 0.4 | 0.6 | 0.8 |
| Properties of heat-resistant ABS resin composition | Impact strength | 27 | 25 | 23 | 24 | 23 |
| | Heat deflection temperature | 113 | 110 | 113 | 110 | 107 |
| | Color(b) | 14 | 13 | 13 | 13 | 14 |
| | ESCR | 244 | 183 | 169 | 162 | 42 |
| | MI | 5.2 | 5.8 | 6.8 | 6.7 | 9.4 |

TABLE 3

| Classification | | Comparative Example 2 | Comparative Example 3 | Comparative Example 4 | Comparative Example 5 | Comparative Example 6 |
|---|---|---|---|---|---|---|
| Polymerization temperature | | 100 | 110 | 100 | 100 | 105 |
| Transition ratio | | 56 | 68 | 69 | 49 | 58 |
| Backend process vacuum degree (torr) | | 20 | 20 | 20 | 20 | 30 |
| Composition of polymerization solution (wt %) | AMS | 68 | 70 | 60 | 80 | 68 |
| | AN | 29 | 30 | 40 | 20 | 29 |
| | SM | 3 | 0 | 0 | 0 | 3 |
| | Initiator 1 | 0 | 0.17 | 0.17 | 0.17 | 0.17 |
| | Initiator 2 | 0.17 | 0 | 0 | 0 | 0 |
| Composition of heat-resistant SAN (wt %) | AMS | 68 | 72 | 67 | 81 | 68 |
| | AN | 28 | 28 | 33 | 19 | 28 |
| | SM | 4 | 0 | 0 | 0 | 4 |
| Properties of heat-resistant SAN | Tg(° C.) | 123 | 120 | 122 | 124 | 119 |
| | Mw | 81,000 | 79,000 | 105,000 | 64,000 | 98,000 |
| | Degree of branching | 0.64 | 0.58 | 0.51 | 0.54 | 0.45 |
| | Amount of oligomer | 0.7 | 1.1 | 0.7 | 0.6 | 1.2 |
| Properties of heat-resistant ABS resin composition | Impact strength | 23 | 21 | 26 | 10 | 23 |
| | Heat deflection temperature | 107 | 104 | 109 | 109 | 102 |
| | Color(b) | 16 | 17 | 18 | 17 | 17 |
| | ESCR | 36 | 31 | 203 | 22 | 171 |
| | MI | 9.9 | 10.5 | 4.5 | 12.4 | 5.7 |

As shown in Tables 1 to 3, it can be confirmed that the heat-resistant ABS resin compositions (Examples 1 to 9) of the present invention have excellent environmental stress crack resistance (ESCR), when compared with the heat-resistant SAN resin compositions (Comparative Examples 1 to 3, and 5) having a low molecular weight.

In addition, it can be confirmed that the heat-resistant ABS resin compositions (Examples 1 to 9) of the present invention have dramatically excellent color and heat resistance (heat deflection temperature), when compared with the heat-resistant ABS resin compositions (Comparative Examples 4 and 6) to which a heat-resistant SAN resin having a low glass transition temperature is applied.

What is claimed is:
1. A method of preparing a heat-resistant styrene-acrylonitrile (SAN) resin, the method comprising:
   polymerizing by adding 0.05 to 0.5 parts by weight of a multifunctional initiator to 100 parts by weight of a monomer mixture comprising 60 to 75 wt % of α-methylstyrene, 25 to 35 wt % of a vinyl cyan compound, and 0 to 10 wt % of an aromatic vinyl compound other than α-methylstyrene, and removing by volatilizing unreacted monomers and a solvent under a pressure of 25 torr or less after the polymerization.

2. The method according to claim 1, wherein the multifunctional initiator comprises 2 to 4 functional groups.

3. The method according to claim 2, wherein the functional groups are peroxide groups.

4. The method according to claim 2, wherein the multifunctional initiator is 2,2-bis(4,4-di-t-butylperoxy cyclohexyl) propane, 1,1-bis(t-butylperoxy) cyclohexane, and a mixture thereof.

5. The method according to claim 1, wherein the polymerization is performed at 95 to 105° C.

6. The method according to claim 1, wherein the polymerization is performed for 6 to 8 hours.

7. The method according to claim 1, wherein the polymerization is continuous bulk polymerization.

8. The method according to claim 1, wherein the removing is performed at 200 to 250° C.

9. A heat-resistant acrylonitrile butadiene styrene (ABS) resin composition comprising:
an ABS resin; and
a heat-resistant styrene-acrylonitrile (SAN) resin,
wherein the heat-resistant SAN resin has a degree of branching of 0.40 to 0.60, a molecular weight of 90,000 to 150,000 g/mol, and a glass transition temperature (Tg) of 124 to 140° C.,
wherein the heat-resistant SAN resin comprises 60 to 75 wt % of α-methylstyrene, 25 to 35 wt % of a vinyl cyan compound, and 0 to 10 wt % of an aromatic vinyl compound other than α-methylstyrene, and
wherein the heat-resistant SAN resin comprises 0.1 to 0.8 wt % of an oligomer.

10. The heat-resistant ABS resin composition according to claim 9, wherein the heat-resistant ABS resin composition comprises 10 to 40 wt % of an ABS resin and 60 to 90 wt % of the heat-resistant SAN resin.

11. The heat-resistant ABS resin composition according to claim 9, wherein the heat-resistant ABS resin composition comprises a hindered phenolic antioxidant, a phosphorous antioxidant, or a mixture thereof.

12. A heat-resistant ABS resin composition comprising:
an acrylonitrile butadiene styrene (ABS) resin; and
a heat-resistant styrene-acrylonitrile (SAN) resin,
wherein the heat-resistant SAN resin has a degree of branching of 0.40 to 0.60, a molecular weight of 90,000 to 150,000 g/mol, and a glass transition temperature (Tg) of 124 to 140° C.,
wherein the heat-resistant SAN resin comprises 60 to 75 wt % of α-methylstyrene, 25 to 35 wt % of a vinyl cyan compound, and 0 to 10 wt % of an aromatic vinyl compound other than α-methylstyrene, and
wherein the heat-resistant ABS resin composition comprises 10 to 40 wt % of an ABS resin and 60 to 90 wt % of the heat-resistant SAN resin.

* * * * *